United States Patent [19]
Takemoto et al.

[11] Patent Number: 6,025,296
[45] Date of Patent: *Feb. 15, 2000

[54] PROCESS FOR PRODUCTION OF CATALYST FOR EXHAUST GAS CLEANING

[75] Inventors: Takashi Takemoto, Higashihiroshima; Makoto Kyogoku; Akihide Takami, both of Hiroshima, all of Japan

[73] Assignee: Mazda Motor Corporation, Hiroshima-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,966

[22] Filed: Jul. 31, 1997

Related U.S. Application Data

[63] Continuation of application No. 08/249,573, May 26, 1994, abandoned.

[30] Foreign Application Priority Data

May 28, 1993 [JP] Japan ................................ 5-126547
May 18, 1994 [JP] Japan ................................ 6-103872

[51] Int. Cl.[7] .............................. B01J 29/00; B01J 37/00
[52] U.S. Cl. .............................. 502/232; 502/66; 502/85; 502/240; 502/300; 502/325; 502/340; 502/514; 423/213.5; 423/700
[58] Field of Search .............................. 502/66, 85, 100, 502/107, 232, 240, 514, 300, 325, 340; 423/213.5, 700

[56] References Cited

U.S. PATENT DOCUMENTS

| | | | |
|---|---|---|---|
| 3,113,931 | 12/1963 | Voltz | 502/107 |
| 3,373,109 | 3/1968 | Frilette et al. | 252/455 |
| 3,403,110 | 9/1968 | Sanborn | 502/66 |
| 4,831,009 | 5/1989 | Retallick | 502/334 |
| 4,874,730 | 10/1989 | Klazinga | 502/61 |
| 4,943,545 | 7/1990 | Chang et al. | 502/56 |
| 5,041,407 | 8/1991 | Williamson et al. | 502/303 |
| 5,043,311 | 8/1991 | Engler et al. | 502/439 |
| 5,145,822 | 9/1992 | Falke et al. | 502/150 |
| 5,164,350 | 11/1992 | Abe et al. | 502/66 |
| 5,306,684 | 4/1994 | Itoh et al. | 502/61 |
| 5,376,344 | 12/1994 | Chattha et al. | 423/213.5 |
| 5,413,976 | 5/1995 | Takami et al. | 502/66 |
| 5,413,984 | 5/1995 | Marecot et al. | 502/333 |
| 5,422,331 | 6/1995 | Galligan et al. | 502/333 |
| 5,427,989 | 6/1995 | Kanesaka et al. | 502/66 |
| 5,489,561 | 2/1996 | Iwakuni et al. | 502/66 |
| 5,496,788 | 3/1996 | Domesle et al. | 502/333 |
| 5,518,976 | 5/1996 | Itoh et al. | 502/66 |
| 5,559,070 | 9/1996 | Torii et al. | 502/240 |

FOREIGN PATENT DOCUMENTS

| | | | |
|---|---|---|---|
| 1 202 295 | 3/1986 | Canada | 423/700 |
| 63-20036 | 1/1988 | Japan | 423/213.5 |
| 243545 | 8/1992 | Japan . | |
| 4-243545 | 8/1992 | Japan . | |
| 873883 | 8/1961 | United Kingdom | 423/700 |

*Primary Examiner*—Gary P. Straub
*Assistant Examiner*—Timothy C Vanoy
*Attorney, Agent, or Firm*—Morrison & Foerster LLP

[57] ABSTRACT

A process is provided for the production of a catalyst useful for removing nitrogen oxides out of exhaust gases from internal combustion engines operated under lean burn conditions. The catalyst is produced by supporting at least one catalytic metal, such as platinum, iridium, rhodium, other transition metals and alkaline earth metals, as the active component on a support, such as a zeolite, by either washcoating a solution of the catalytic metal components onto the support; evaporating off solvent from a mixture of solvent, catalyst material and support, or rapidly drying droplets of support and catalyst material containing slurry with a hot gas. The supported catalyst is activated by heating to a temperature of 150 to 300° C. for a period of time sufficient to desorb catalytic material components, such as water, chlorine and ammonia, out of the pores of the catalyst that adversely affect the activity and heat resistance of the catalyst.

34 Claims, 7 Drawing Sheets

PROCESS FOR PRODUCTION OF CATALYST FOR EXHAUST GAS CLEANING

This application is a continuation of prior application Ser. No. 08/249,573, filed May 26, 1994, now abandoned.

BACKGROUND OF THE INVENTION

1. Field of the Invention

The present invention relates to a process for the production of catalyst for exhaust gas cleaning, which is, for example, used for exhaust gas from an automobile engine.

2. Description of the Related Art

Catalyst for exhaust gas cleaning such as ternary system catalyst, oxidation catalyst or NOx cleaning catalyst which removes NOx in an atmosphere comprising excessive oxygen is formed by supporting an active component (such as a catalytic metal) on and/or in an inorganic carrier material which is porous.

In order that the active component is supported on/in the carrier material (i.e. on an outer surface and an inner surface of the carrier material, that is, inner surfaces of pores of the carrier material), various methods are employed such as an impregnation method in which a carrier material is impregnated with a solution containing an active component, an evaporation-to-dryness method in which a slurry of an active component solution containing the carrier material in the form of powder dispersed therein is evaporated to dryness, an ion exchange method in which a cation of a metal-containing-silicate such as zeolite (a porous crystalline material having micro pores) is exchanged with an active component and so on. For example, Japanese Patent Kokai Publication No. 243545/1992 discloses a process in which a catalytic metal as an active component such as Pt and Rh is supported on a zeolite carrier by means of the ion exchange method.

However, the catalyst in the form of powder produced by the impregnation method, the evaporation-to-dryness method or the ion exchange method is not always stable in its performance of exhaust gas cleaning. Thus, there have been problems that a NOx cleaning ratio is sometimes lower than expected, that heat resistance of the catalyst is sometimes insufficient, and that the catalytic metal is fallen off the powder catalyst when the powder catalyst is wash coated on a honeycomb support member.

SUMMARY OF THE INVENTION

It is, therefore, an object of the present invention to provide a process for the production of catalyst which overcomes the problems as described above.

The present inventors have made extensive studies to achieve the object and found that the weight of a metal containing silicate catalyst is changed when it is heated. On observing the weight change, the inventors have found the following:

During a synthesis step of the metal containing silicate and/or during a supporting step of the active component (such as a catalytic metal) on the silicate, water molecules are adsorbed in micro pores of the metal containing silicate. Alternatively, when Ir, as the catalytic metal, is supported on the silicate using $IrCl_3$, chlorine is adsorbed in the pores. In another case, when Pt is supported as the catalytic metal on the silicate using a divalent platinum ammine crystal (tetraammineplatinum(II) dichloride, $[Pt(NH_3)_4]Cl_2$), $NH_3$ is adsorbed in the pores. Such adsorbed materials adversely affect the activity and heat resistance of the catalyst.

According to the present invention, at least one catalytic metal as an active component is supported on a metal containing silicate and then the silicate is subjected to a thermal treatment (an activation treatment) so as to overcome the above problems.

DETAILED DESCRIPTION OF THE INVENTION

In the first aspect, the present invention provides a process for the production of catalyst for exhaust gas cleaning characterized in that at least one catalytic metal as an active component is supported on a metal containing silicate, and then the silicate is subjected to an activation treatment in which the silicate is heated to 150–340° C. for a predetermined period.

In the first aspect, not only materials which have been adsorbed in pores of the metal containing silicate such as water are desorbed from the silicate, but also the catalytic metal is strongly deposited to the silicate so that an activity, heat resistance of the catalyst and stability of a supported condition of the catalytic metal on the silicate are improved.

In the process of the first aspect, when the temperature of the activation treatment to which the silicate is heated (an activation temperature) is lower than 150° C., the desorption of the adsorbed materials such as water would be insufficient so that no predetermined effect would be obtained. To the contrary, when the activation temperature is higher than 340° C., acid sites of the metal containing silicate may be broken so that the activity of the catalyst may be lowered, which would be in particular critical when a noble metal such as Pt is used as the catalytic metal for cleaning of exhaust gas from an automobile so as to reduce NOx therein. Such exhaust gas catalyst activates a hydrocarbon contained in the exhaust gas from engine combustion at a lean air/fuel ratio (which contains excessive oxygen), and NOx is decomposed by using the activated hydrocarbon. In such a process, the acid sites of the metal containing silicate contribute to cleaning to reduce NOx through acceleration of the activation of the hydrocarbon. In that view point, the breakage of the acid sites is critical.

There is no specific limitation on the kind of the catalytic metal as the active component in the present invention. Any conventional metal used for the exhaust gas cleaning catalyst may be used. For example, a noble metal (such as Pt, Ir or Rh), a transition metal rather than the noble metal or an alkaline earth metal or any combination thereof may be used as the catalytic metal of the present invention. The catalytic metal may be present in any form such as an element, a compound, a salt and any mixture thereof in the metal containing silicate.

When the catalytic metal is supported on the metal containing silicate, any manner which is conventionally used for supporting the catalytic metal. In one preferable embodiment, a solution of the catalytic metal which contains the catalytic metal in the form of an elementary substance, a compound, an ion, a salt or any mixture thereof may be used in the form of a slurry or a dispersion in which silicate particle carrier or silicate powder carrier is dispersed therein. In the second or any other aspect which will be explained below, such a slurry may be used. It should be understood that there is no substantial difference between the slurry and the dispersion except the size of the silicate material and both may be used in the present invention.

There is no specific limitation on the kind of a solvent in which the catalytic metal (including a compound and a salt thereof) is dissolved. As the solvent, the following may be used: water; an organic solvent such as an alcohol; an inorganic solvent or any mixture solvent thereof, provided that it does not adversely affected on the supporting step of the catalytic metal.

As the metal containing silicate, an aluminosilicate (zeolite) is preferably used in which Al is present to form a framework of crystal (crystalline lattice). In addition, other metal-containing silicate may be also used in which other metal such as Ga, Ce, Mn and/or Tb is present as the framework element in place of or in addition to Al. When the zeolite is used, preferred types thereof are A type, X type, Y type, mordenite type, ZSM-5 type and so on. Any size of the metal containing silicate may be used provided that it does not adversely affect on a catalyst performance. Generally, the metal containing silicate is preferably in the form of a pellet, a particulate or powder.

The above activation treatment may be carried out in an atmospheric condition. Alternatively, it may be carried out in a reduced pressure. When the treatment is carried out in the reduced pressure, the heating temperature may be reduced, and also the period of the activation treatment may be shortened.

In a preferred embodiment, after the metal containing silicate has been hydrothermally synthesized and before the catalytic metal is supported, the metal containing silicate may be effectively subjected to a dehydration treatment at a temperature of 200–500° C. as a pretreatment.

In the second aspect, the present invention provides a process for the production of catalyst for exhaust gas cleaning according to the first aspect characterized in that said at least one catalytic metal is supported on the metal containing silicate by an evaporation-to-dryness method in which the metal containing silicate is mixed with the solution of the catalytic metal as described above to have a mixture and volatile component(s) of the mixture is evaporated off and that, after said activation treatment, the metal containing silicate supporting the catalytic metal, a binder and water are mixed together to have a slurry and then the slurry is hardened.

Since, in the conventional evaporation-to-dryness method, a salt of the catalytic metal is supported on the metal containing silicate without complete decomposition thereof, the catalytic metal is likely to be dissolved into a slurry when the silicate is formed into the slurry together with water and a binder. However, according to the present invention, the catalytic metal is strongly deposited on the silicate through decomposition of the salt of the catalytic metal during the activation treatment, so that the dissolution as in the conventional method is effectively prevented.

In the present invention, hardening of the slurry is carried out by wash-coating the slurry on a monolithic supporting member, drying and firing it. Alternatively, the slurry may be shaped into pellets.

In the second aspect of the present invention, the binder is used for strengthening bond between the metal containing silicate materials and/or between the metal containing silicate and the supporting member. As the binder, for example, hydrated alumina may be used.

In the second aspect, the activation temperature is preferably in a range of 150 to 330° C. When the temperature is above 330° C., the activity of the catalyst becomes lower regardless a period of the activation treatment. The activation temperature is more preferably in a range of 180 to 320° C. Such a temperature range further ensures the improvement of the catalyst activity.

In the third aspect, the present invention provides a process for the production of catalyst for exhaust gas cleaning according to the first aspect characterized in that said at least one catalytic metal is supported on the metal containing silicate by forming a slurry in which powder of the metal containing silicate is dispersed in the solution of the catalytic metal, forming droplets from the slurry and rapidly drying the droplets by contacting with hot gas (such as air), and that, after said activation treatment, the metal containing silicate supporting the catalytic metal, a binder and water are mixed together to prepare a second slurry and said second slurry is hardened. The binder and hardening of the slurry of the second aspect are also applicable to the binder and said second slurry of the third aspect.

In the third aspect, the slurry may be produced into the droplet form by dropping or any other conventional manner such as spraying and the like. The latter produces much smaller droplets. The droplet may be contacted with the hot gas in any suitable mode such as a countercurrent flow mode, in a parallel flow mode or in a mixed flow mode.

In the third aspect, since the hot gas contacts the droplets of the slurry, the solvent of the slurry is rapidly evaporated so that the catalytic metal is supported by the metal containing silicate as the carrier. In this case, the silicate powder does not have to be in contact with the catalytic metal solution in the form of the slurry for a long time, and the slurry itself does not have to be heated separately. Therefore, the catalytic metal is less degraded. Since the slurry is rapidly dried by contacting with the hot gas, supported and distributed conditions of the catalytic metal in the metal containing silicate as the resulted catalyst powder are very likely to be uniform. Thus, as in the case of the second aspect of the evaporation-to-dryness method, the activation treatment deposits the catalytic metal strongly to the metal containing silicate, so that the dissolution into said second slurry is prevented.

When the spray drying method is employed for the formation of the droplets in the third aspect, a disc atomizer, a pressure nozzle, a two fluid nozzle and the like may be used for spraying. In such a case, since the slurry is divided into extremely fine droplets through spraying, both of rapid drying and atomization of the catalyst powder are achieved.

In the third aspect, the activation temperature is preferably in a range of 160 to 340° C. When the temperature is below 160° C., the activity of the resulted catalyst becomes lower. The activation temperature is more preferably in a range of 180 to 310° C. Such a temperature range further ensures the improvement of the catalyst activity.

In the fourth aspect, the present invention provides a process for the production of catalyst for exhaust gas cleaning according to any one of the first to third aspects characterized in that a period of the activation treatment is three hours or longer. When the period is less than three hours, the improvement of the catalyst activity may not be surely expected.

In the fifth aspect, the present invention provides a process for the production of catalyst for exhaust gas cleaning according to any one of the second to fourth aspects characterized in that the solution of the catalytic metal is produced by dissolving a salt of the catalytic metal in the solvent which has been already explained above. In the conventional case where the catalytic metal is supported on the metal containing silicate using the solution in which the salt of the catalytic metal is dissolved, the dissolution of the catalytic metal from the metal containing silicate into the slurry usually has occurred. Thus, the present invention has a great meaning in the prevention of the dissolution. The salt is not particularly limited and any the conventional salts for the production of the exhaust gas cleaning catalyst may be used. For example, $[Pt(NH_3)_4]Cl_2$ may be used.

EFFECTS OF THE INVENTION

According to the first aspect of the present invention, since the activation treatment is carried out at a temperature of 150–340° C. for a predetermined period after the catalytic metal has been supported on the metal containing silicate, the adsorbed materials such as water in the silicate is desorbed and the catalytic metal is strongly deposited to the metal containing silicate, whereby not only the activity and the heat resistance of the catalyst are improved, but also the catalytic metal is prevented from its falling off the carrier in the case where the catalyst is wash coated.

According to the second aspect of the present invention, since the catalytic metal is supported by the evaporation to dryness method and the silicate is formed into the slurry after the activation treatment, the dissolution of the catalytic metal is prevented so that the catalyst activity becomes kept high. Further, in the preferable embodiment, since the activation temperature is in the range of 150 to 330° C., the activity of the resulted catalyst is higher. In the more preferable embodiment, since the activation temperature is in the range of 180 to 320° C., the activity of the resulted catalyst is further higher.

According to the third aspect of the present invention, since rapid drying is employed for supporting the catalytic metal on the metal containing silicate by using the contact of the slurry droplets with the hot air and, after the activation, said second slurry is prepared, the catalyst activity, the heat resistance of the catalyst and the supported stability of the catalytic metal are improved while the uniform distribution of the supported catalytic metal on the metal containing silicate is ensured. Further, in the preferable embodiment, since the activation temperature is in the range of 160 to 340° C., the activity of the resulted catalyst is higher. In the more preferable embodiment, since the activation temperature is in the range of 180 to 310° C., the activity of the resulted catalyst is further higher.

According to the fourth aspect, since the activation period is longer than three hours, the activity of the catalyst is surely improved.

According to the fifth aspect, although the salt of the catalytic metal is dissolved into the solvent to prepare the solution of the catalytic metal, the dissolution of the catalytic metal from the metal containing silicate to the slurry is prevented.

EXAMPLES

The present invention will be explained in detail with reference the following examples and the accompanying drawings.

Examples 1 to 10 (Evaporation-to-dryness method)
[Preparation of Catalyst Material]

Ammineplatinum (II) crystal, iridium trichloride and rhodium nitrate were weighed to have a weight ratio (Pt:Ir:Rh) of 30:3:1. Ammineplatinum (II) crystal and rhodium nitrate were dissolved in water (ion-exchanged water) to prepare an aqueous solution thereof, and iridium trichloride was dispersed in ethanol to have a dispersion. Then, the solution and the dispersion were mixed together and H-type ZSM-5 powder (having a $SiO_2/Al_2O_3$ ratio of 70) was added to the mixture. The resulted mixture was stirred for two hours at room temperature, then heated to 80° C. for about three hours so that the liquid components were evaporated, and further dried at a temperature of 150° C. for about six hours in a constant temperature oven to obtain catalyst powder comprising ZSM-5 and Pt, Ir and Rh supported thereon.

[Activation Treatment]

The obtained catalyst powder was subjected to the activation in an atmosphere with various treatment temperatures and various treatment periods as shown in following Table 1:

TABLE 1

|  | Treatment Temperature (°C.) | Treatment Period (hour) | Maximum NOx Cleaning Ratio (%) |
| --- | --- | --- | --- |
| Example 1 | 150 | 2 | 45 |
| Example 2 | 150 | 10 | 49 |
| Example 3 | 150 | 20 | 49 |
| Example 4 | 180 | 16 | 48.4 |
| Example 5 | 200 | 3 | 47.3 |
| Example 6 | 200 | 8 | 50 |
| Example 7 | 200 | 16 | 54.7 |
| Example 8 | 200 | 23 | 48.9 |
| Example 9 | 200 | 24 | 49 |
| Example 10 | 220 | 16 | 52.9 |
| Example 11 | 260 | 4 | 49.5 |
| Example 12 | 260 | 8 | 50 |
| Example 13 | 260 | 16 | 53.3 |
| Example 14 | 260 | 24 | 50.6 |

TABLE 1-continued

|  | Treatment Temperature (°C.) | Treatment Period (hour) | Maximum NOx Cleaning Ratio (%) |
|---|---|---|---|
| Example 15 | 300 | 2 | 48 |
| Example 16 | 300 | 16 | 50 |
| Example 17 | 300 | 25 | 49 |
| Example 18 | 350 | 2 | 40 |
| Example 19 | 350 | 10 | 40 |
| Example 20 | 350 | 25 | 42 |
| Comparative Example | — | — | 43.5 |

[Wash Coating]

A slurry was prepared by mixing the powder catalyst of each Example produced as described above together with a binder (hydrated alumina) and a predetermined amount of water. The slurry was wash coated on a cordierite made honeycomb support member having 400 cells/(inch)$^2$ to have a catalyst member such that the support member carried Pt, Ir and Rh in a total amount of 4.5 g per one liter of the carrier. The catalyst member was fired at temperature of 500° C. for two hours to have a final catalyst member for exhaust gas cleaning.

As Comparative Example, another powder catalyst was prepared by repeating the above Examples except that no activation treatment was carried out. The powder catalyst was coated on the support member by wash coating and the member was fired to have a catalyst member for exhaust gas cleaning.

[Cleaning Test]

The catalyst member for exhaust gas cleaning of each Example or that of Comparative Example was charged in an atmospheric fixed bed type flow reactor, and a NOx cleaning ratio was measured so as to estimate each exhaust gas catalyst. In each test, model exhaust gas corresponding to A/F (air/fuel) of 22 was used, which was supplied to the reactor to provide a space velocity (S. V.) of 55000 hr$^{-1}$ and a maximum NOx cleaning ratio was measured. The results are also shown in above Table 1. The maximum NOx cleaning ratio in Table 1 is the most largest NOx cleaning ratio measured.

As seen from Table 1, the maximum NOx cleaning ratio is the largest at the treatment period of 16 hours and the treatment temperature of 200° C. In the cases in which the treatment temperature becomes lower from 200° C. and also becomes higher from 200° C., the maximum NOx cleaning ratio becomes lower. Particularly, in the cases of the treatment temperature of 150° C. and 350° C., the maximum NOx cleaning ratio is further lower. With respect to the treatment period, the maximum NOx cleaning ratio shows a peak value at around the treatment period of 16 hours in any treatment temperature condition.

Figure 1:
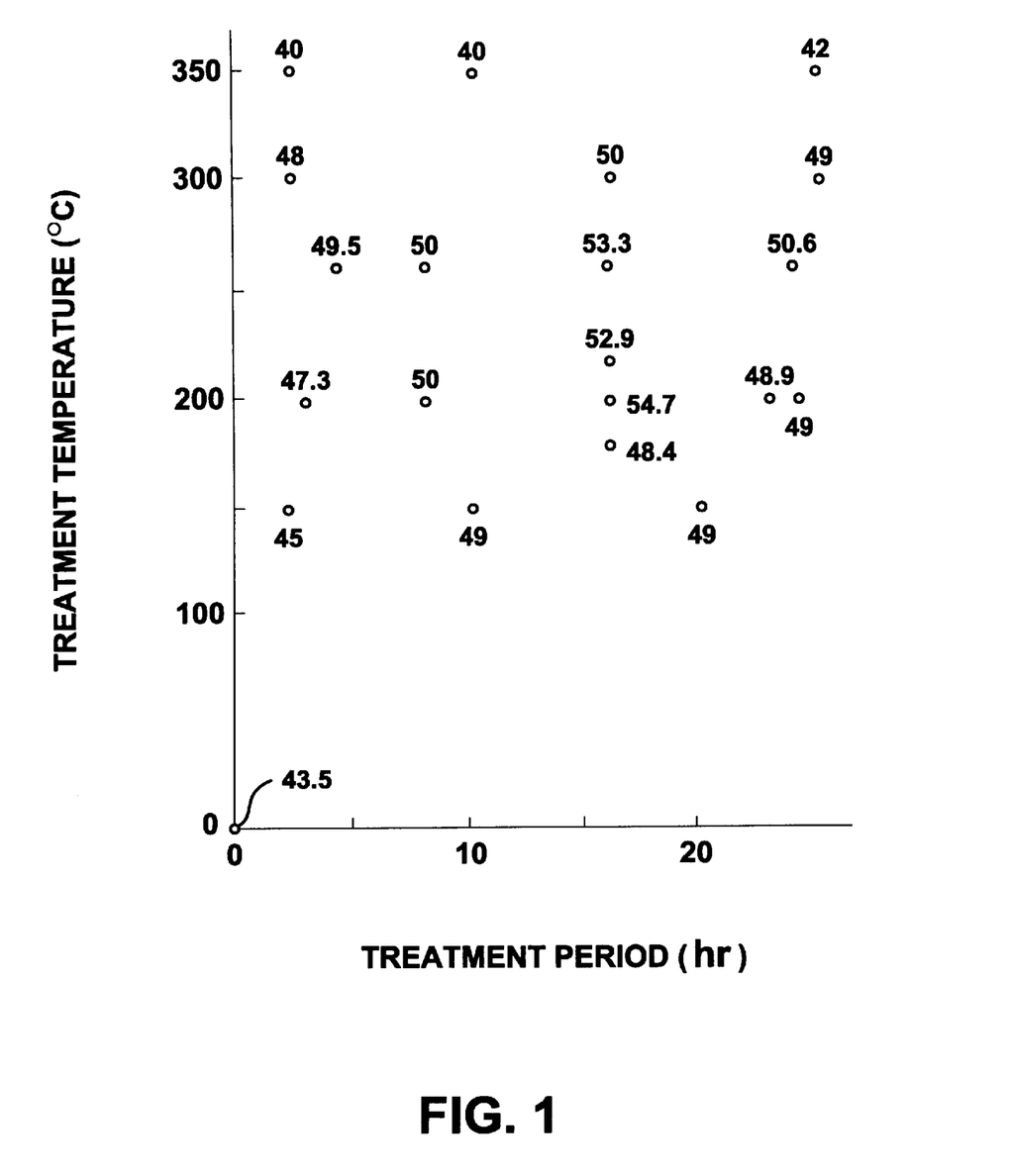
FIG. 1 shows a graph in which condition points of the temperature and the period during the activation treatment of the catalyst prepared by an evaporation-to-dryness method according to the present invention is shown while a value of a maximum NOx cleaning ratio at each point is indicated therein.
Figure 2:
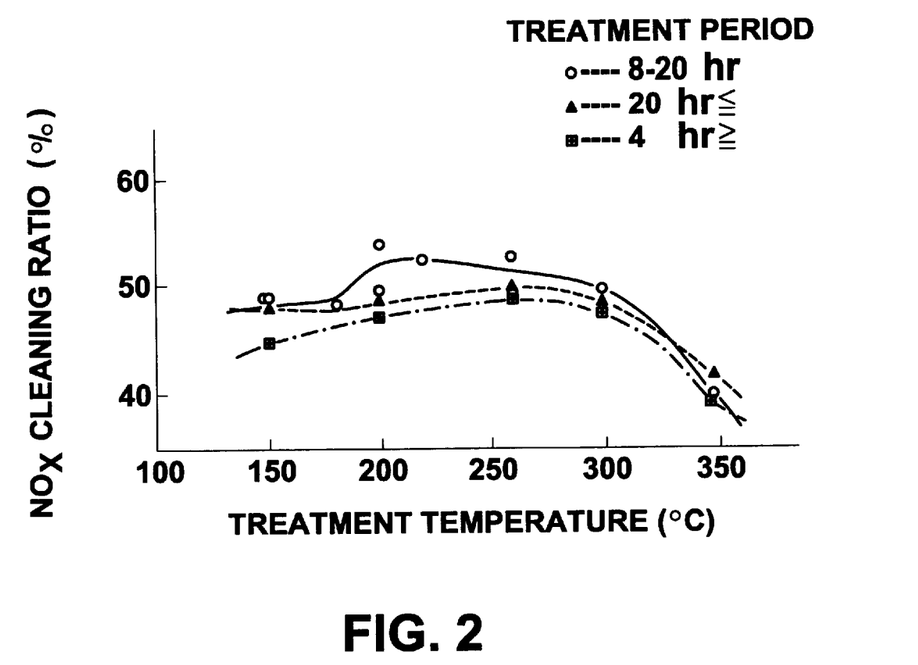
FIG. 2 shows a graph in which a relationship between the activation treatment temperature of the catalyst prepared by the evaporation-to-dryness method and the maximum NOx cleaning ratio.
Figure 3:
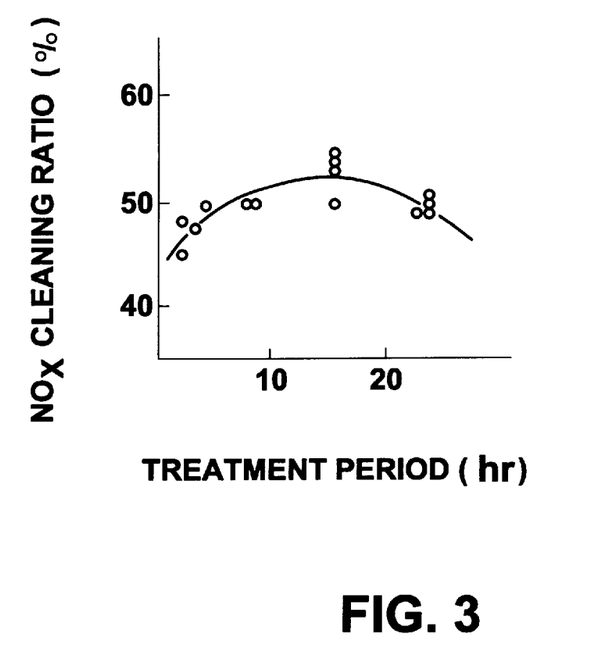
FIG. 3 shows a graph in which a relationship between the activation treatment period of the catalyst prepared by the evaporation-to-dryness method and the maximum NOx cleaning ratio.

FIG. 1 shows a graph in which a condition point of the temperature and the period during the activation treatment in each Example is shown while a value of the maximum NOx cleaning ratio is indicated therein. FIG. 2 shows a graph in which a relationship between the activation treatment temperature and the maximum NOx cleaning ratio, and FIG. 3 shows a graph in which a relationship between the activation treatment period and the maximum NOx cleaning ratio (only within a temperature range of 200to 300° C.), both graphs being based on the data of Table 1.

The temperature and the period of the activation treatment do not so highly affect on the maximum NOx cleaning ratio. However, it is seen from FIGS. 2 and 3 that the temperature of the activation treatment is preferably in a range of 150 to 330° C., more preferably in a range of 180 to 320° C., and most preferably in a range of 180 to 300° C., and that the period of the activation treatment is preferably three hours or longer.

It is contemplated that, with respect to the powder catalyst produced by the evaporation-to-dryness method, both or either of an extent that the catalytic metal is distributed uniformly in ZSM-5 and an extent that the catalytic metal is stably supported by ZSM-5 scatter, whereby the effect of the activation treatment does not remarkably appear. Thus, differences in the activation temperature and also in the activation period do not affect the maximum NOx cleaning ratio so much. However, considering that the catalyst of Comparative Example which was produced without the activation treatment showed the maximum NOx cleaning ratio of 43.5% on average which ratio is based on the maximum NOx cleaning ratio data scattering between 40 to 50%, the advantage due to the activation treatment is sufficiently supported.

Examples 21 to 43 (Spray drying method)

[Spray Drying Apparatus]

Figure 4:
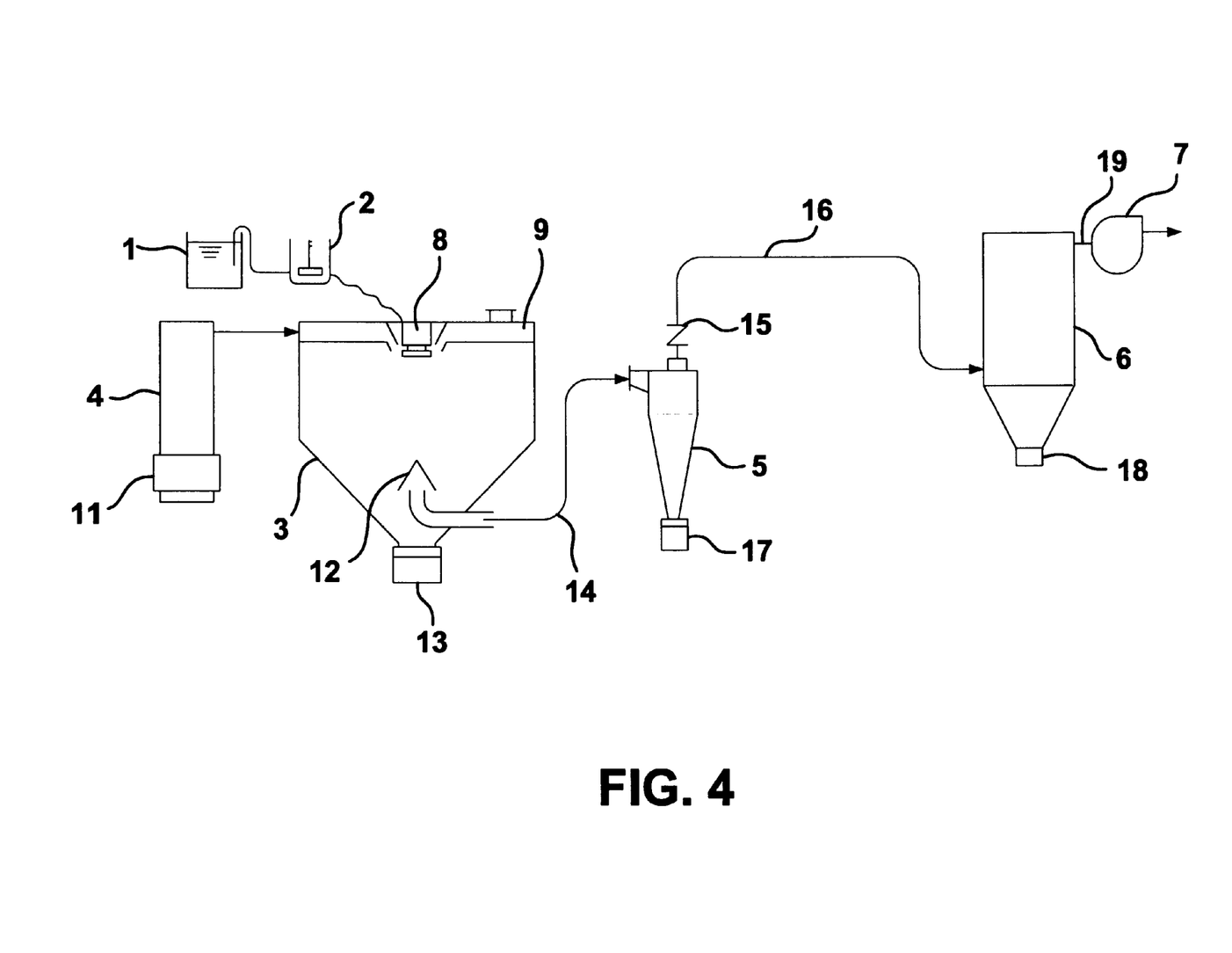
FIG. 4 schematically shows a flow sheet of a spray drying apparatus.

The following Examples were carried out in a parallel mode spray drying, and a flow sheet of an apparatus used in the Examples is schematically shown in FIG. 4 wherein the numerical number 1 indicates a slurry vessel, 2 does a tube pump (a kind of squeezing pump), 3 does a drying chamber, 4 does an electric heating unit, does a primary cyclone, 6 does a secondary cyclone and 7 does an exhaust fan.

A slurry comprising a catalytic metal solution and a powder carrier is stored in the slurry vessel 1 and the tube pump 2 passes the slurry to an atomizer 8 which is located at the top of the drying chamber 3. In the top portion (ceiling) of the drying chamber 3, a hot air chamber 9 is formed to which hot air heated by the electric heating unit 4 is supplied. An annular opening is formed around the atomizer 8, and the hot air is supplied from s the hot air chamber 9 to the drying chamber 3 through the opening. The electric heating unit 4 is equipped with a filter 11 through which air to be heated is taken into the bottom of the heating from the outside. The heated air is supplied to the hot air chamber 9 from the top portion of the heating unit.

The drying chamber 3 is equipped with an exhaust unit 12 in its center below which a first receiver 13 for powder catalyst is provided. As shown in FIG. 4, the exhaust unit 12 is so constructed that a hollow cone-shaped member is located above an exhaust opening of a first exhaust tube 14 which is connected to an upper side surface of the primary cyclone 5. A second exhaust tube 16 having a flow rate regulation damper connects the top of the primary cyclone and a side of the secondary cyclone 6. A second receiver 17 for the powder catalyst is placed at the bottom the primary cyclone 5, and a third receiver 18 at the bottom of the secondary cyclone 6. The exhaust fan 7 is located on a third exhaust tube 19 extending from the top of the secondary cyclone 6.

[Preparation of Slurry]

Ammineplatinum (II) crystal,iridium trichloride and rhodium nitrate were weighed to have a weight ratio (Pt:Ir:Rh) of 30:3:1. Ammineplatinum (II) crystal and rhodium nitrate were dissolved in water (ion-exchanged water) to prepare an aqueous solution thereof, and iridium trichloride was dispersed in ethanol to have a dispersion. Then, the solution and the dispersion were mixed together and H-type ZSM-5 powder (having a $SiO_2/Al_2O_3$ ratio of 70) was added to the mixture. The resulted mixture was stirred for two hours at room temperature.

[Spray Drying]

An atmosphere in the drying chamber 3 was kept at a temperature of 160° C. by supplying heated air to the chamber 3 from the electric heating unit 4. Then, the slurry was supplied to the atomizer 8 from the vessel 1 through the tube pump 2 to spray the slurry into the drying chamber 3. A rotational speed of a nozzle of the atomizer 8 was 8000 rpm.

[Collection of Powder Catalyst]

Finely atomized droplets of the slurry were rapidly dried (for example, in about 2 to 5 seconds) by the contact with the hot air, and a portion of the dried droplets (namely, the powder catalyst) is collected in the first receiver 13 for the powder catalyst. The powder catalyst floating in the drying chamber 3 is discharged to the primary cyclone together with the hot air through the first exhaust tube 14, a portion of which powder is collected in the second receiver 17 for the powder catalyst. Further, the powder catalyst floating in the primary cyclone is discharged to the secondary cyclone 6 together with the hot air through the second exhaust tube 16, which powder is collected in the third receiver 18 for the powder catalyst.

[Conditions of Spray Drying]

A temperature of the atmosphere within the drying chamber 3 is preferably 140–190° C. The nozzle rotational speed is preferably not less than 5000 rpm. As to a slurry feed rate which depends on a spraying pressure, the feed rate of 4–9 liters/hour is preferable when a volume of the drying chamber is about 700 liters. As to an exhaust gas rate of the exhaust fan 7, it is suitably selected under consideration that the greater exhaust gas rate results in the less collected powder catalyst.

[Activation Treatment]

The obtained catalyst powder produced by the spray drying method was subjected to the activation treatment in an atmospheric condition with various heating temperatures and various heating periods shown in following Table 2:

TABLE 2

|  | Treatment Temperature (°C.) | Treatment Period (hour) | Maximum NOx Cleaning Extent (%) |
|---|---|---|---|
| Example 21 | 150 | 2 | 43 |
| Example 22 | 150 | 10 | 44 |
| Example 23 | 150 | 20 | 48 |
| Example 24 | 200 | 4 | 50 |
| Example 25 | 200 | 8 | 55.6 |
| Example 26 | 200 | 14 | 58 |
| Example 27 | 200 | 16 | 52.7 |
| Example 28 | 200 | 24 | 53 |
| Example 29 | 240 | 14 | 50 |
| Example 30 | 260 | 1 | 45.5 |
| Example 31 | 260 | 4 | 51 |
| Example 32 | 260 | 8 | 53.8 |
| Example 33 | 260 | 14 | 54.7 |
| Example 34 | 260 | 16 | 58 |
| Example 35 | 260 | 19 | 53.7 |
| Example 36 | 260 | 24 | 55 |
| Example 37 | 275 | 16 | 55 |
| Example 38 | 300 | 2 | 51 |
| Example 39 | 300 | 10 | 53 |
| Example 40 | 300 | 25 | 50 |
| Example 41 | 350 | 2 | 45 |
| Example 42 | 350 | 10 | 46 |
| Example 43 | 350 | 25 | 46 |
| Comparative Example | — | — | 44 |

[Wash Coating and Cleaning Test]

As in the cases of Examples 1 to 20 for the catalyst powder produced by the evaporation-to-dryness method, an exhaust gas catalyst member was prepared from each powder catalyst of Examples 21 to 43, and each exhaust gas catalyst member was tested in the same manner as in that for the exhaust gas catalyst member by the evaporation-to-dryness method described above. In addition, an additional exhaust gas catalyst member was produced as Comparative Example using catalyst powder prepared in the same manner as in the Examples except that no activation treatment was carried out. This member was also tested in the same manner. The results are shown also in Table 2.

As seen from Table 2, the maximum NOx cleaning ratios at the activation temperatures of 200° C. and 260° C. showed the similar higher values. When the activation temperature is lower than 200° C. or higher than 260° C., the maximum NOx cleaning ratio is likely to be decreased, and the maximum NOx cleaning ratio at the activation temperatures of 150° C. and 350° C. showed further smaller values. The reason why the maximum NOx cleaning ratio of Example 30 is small seems to be the shorter treatment period. In Comparative Example, the maximum NOx cleaning ratio was 44% on average, though each ratio of Comparative Example scattered.

Figure 5:
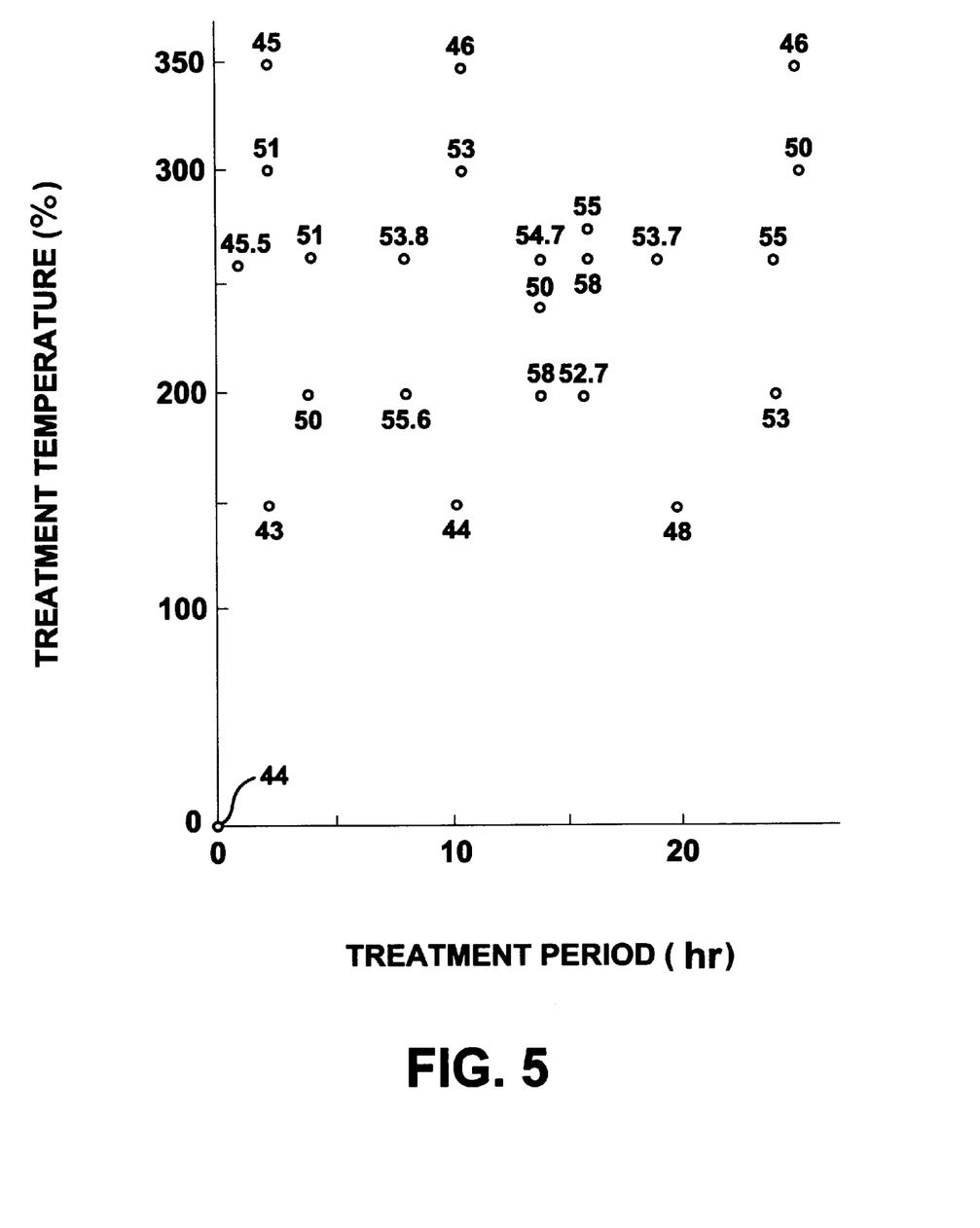
FIG. 5 shows a graph in which condition points of the temperature and the period during the activation treatment of the catalyst prepared by a spray drying method according to the present invention is shown while a value of a maximum NOx cleaning ratio at each point is indicated therein.
Figure 6:
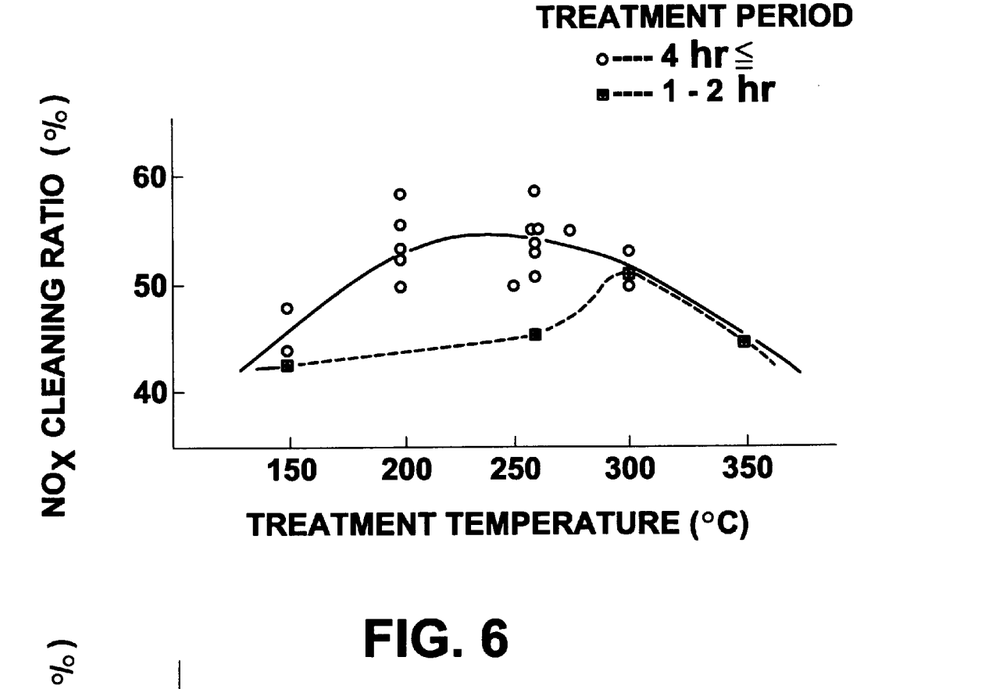
FIG. 6 shows a graph in which a relationship between the activation treatment temperature of the catalyst prepared by the spray drying method and the maximum NOx cleaning ratio.
Figure 7:
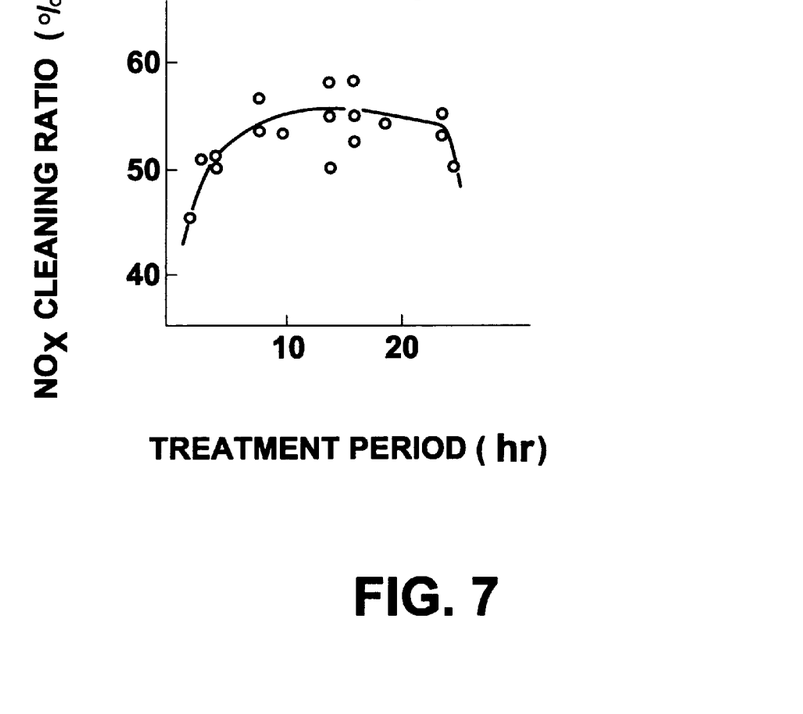
FIG. 7 shows a graph in which a relationship between the activation treatment period of the catalyst prepared by the spray drying method and the maximum NOx cleaning ratio.

FIG. 5 shows a graph in which a condition point of the temperature and the period during the activation treatment in each Example is shown while a value of the maximum NOx cleaning ratio is indicated therein. FIG. 6 shows a graph in which a relationship between the activation treatment temperature and the maximum NOx cleaning ratio, and FIG. 7 shows a graph in which a relationship between the activation treatment period and the maximum NOx cleaning ratio (only within a temperature range of 200 to 300° C.), both graphs being based on the data of Table 2.

The temperature and the period of the activation treatment do not so highly affect on the maximum NOx cleaning ratio. However, it is seen from FIGS. 6 and 7 that the temperature of the activation treatment is preferably in a range of 160 to 340° C. and more preferably in a range of 180 to 310° C., and that the period of the activation treatment is preferably three hours or longer.

When the activation temperature was 250° C. or higher, the maximum NOx cleaning ratio scattered. That scattering seems to be due to an effect of deposition of the catalytic metal to ZSM-5 powder particles and also an effect of sintering of the catalytic metal.

That is, for example Pt as the catalytic metal has a re-crystallization temperature at about 250° C. When the exhaust gas catalyst comprising Pt is heated at around such a temperature for a relatively long time, Pt is re-crystallized and at the same time bond of Pt to ZSM-5 becomes stronger, which at least partially makes the cleaning ratio scatter. Also, decomposition of noble metal salts deposited on ZSM-5 is accelerated by the activation treatment at such a higher temperature, whereby oxidation reaction is likely to occur. In the case of the exhaust gas catalyst prepared by the evaporation-to-dryness method, since it has been subjected to severe thermal conditions during the evaporation to dryness step, it does not show such a remarkable trend as that of the exhaust gas catalyst prepared by the spray drying method.

As to the catalyst produced by the spray drying, since the catalytic metal is sufficiently dispersed in the ZSM-5 powder, sintering is directly reflected as the decrease of the catalyst activity. To the contrary, as to the catalyst produced by the evaporation- to-dryness method, since the catalytic metal is not so sufficiently dispersed as that produced by the spray drying method, the decrease of the activity due to sintering is less.

[Heat resistance]

Heat resistance of the exhaust gas catalyst powder produced by the spray drying method which had been subjected to the activation treatment was compared with that of the catalyst powder which had not been subjected to the activation treatment. Three kinds of a catalyst member were produced each comprising a honeycomb support member and catalyst powder supported thereby which had been subjected to the activation treatment. Also, another three kinds of a catalyst member were produced each comprising the honeycomb support member and catalyst powder supported thereby which had not been subjected to the activation treatment. Both types of the three catalyst members had a total amount of the catalytic metals (Pt, Ir and Rh) of 3 g, 4.5 g and 6 g per one liter of the honeycomb support member, respectively.

With respect to each catalyst member, the maximum NOx cleaning ratios were measured before and after the catalyst member had been subjected to a thermal treatment (an aging treatment) for the estimation of the heat resistance. The weight ratio of the catalytic metals supported in the ZSM-5 catalyst powder and conditions of the activation treatment and the thermal treatment were as follows:

Weight ratio of supported catalytic metals:
Pt:Ir:Rh=30:6:1
Activation treatment:
200° C. for 14 hrs. (in an atmospheric condition)
Thermal treatment:
800° C. for 8 hrs.

Figure 8:
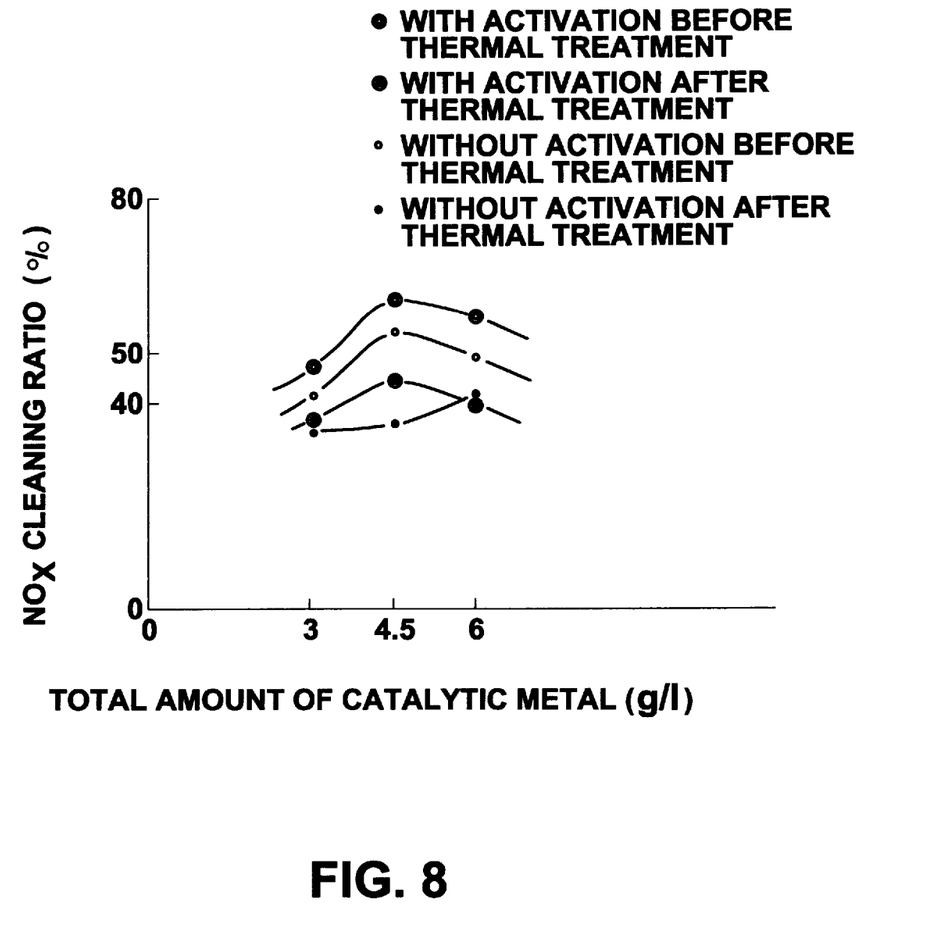
FIG. 8 is a graph which shows a relationship between a total weight of supported catalytic metals and a NOx cleaning ratio when catalyst was prepared by the spray drying method.

The results are shown in a graph of FIG. 8.

As seen from the graph, the catalyst member comprising the catalyst powder produced through the activation treatment (the total amount of 3 g or 4.5 g of the catalytic metals was loaded) showed the higher activity not only before the thermal treatment, but also after the thermal treatment compared with the member comprising the catalyst powder which had not been subjected to the activation treatment.

In addition, other catalyst powder was prepared in which an total amount of the catalytic metals was 4.5 g per one liter of the catalyst member and the weight ratio of Pt:Ir:Rh was 30:X:1 (wherein X is variable). Each of the prepared powder catalyst was subjected to the same test for the thermal resistance as described above. The results are shown in a graph of FIG. 9. In these tests, the catalyst which had been subjected to the activation treatment showed the higher NOx cleaning ratio even after the thermal treatment.

Figure 9:
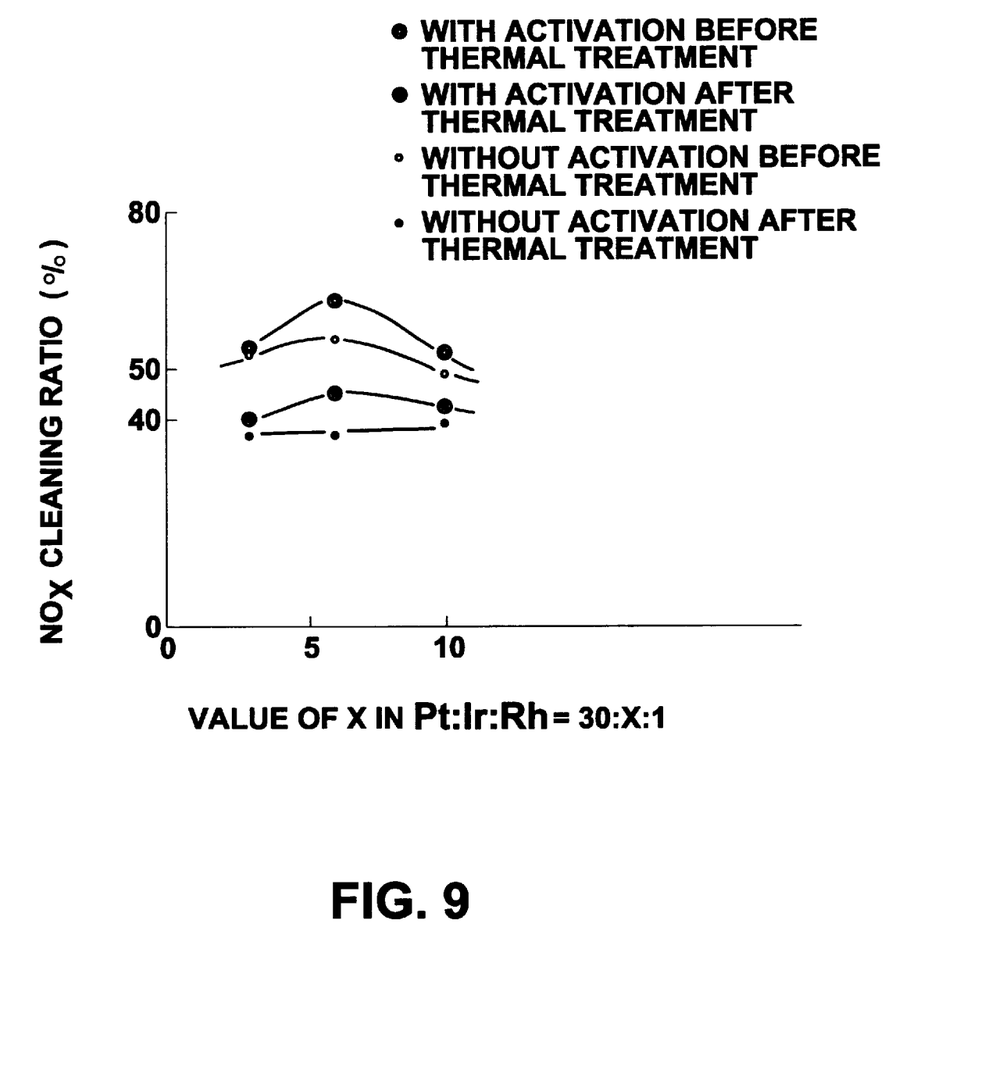
FIG. 9 is a graph which shows a relationship between an value of X and the NOx cleaning ration when Pt:Ir:Rh is 30:X:1 in the case in which the catalyst was prepared by the spray drying method.

FIGS. 8 and 9 indicate that the total amount of the supported catalytic metal within a certain range a center of which is about 4.5 g and X in a range around 6 provide the desirable results. However, in any case, it is proved that the activation treatment improves the heat resistance of the catalyst.

What is claimed is:

1. A process for production of a catalyst applied to a structural support member for cleaning exhaust gas formed by an engine operated under a continuous lean mode, comprising:
   (1) supporting at least two catalytic metals as active components on a metal-containing silicate by a supporting treatment comprising:
      (a) mixing the metal containing silicate with an aqueous solution comprising one of said at least two catalytic metals and an alcohol dispersion comprising another of said at least two catalytic metals to form mixture and
      (b) then depositing said at least two catalytic metals by a deposition method consisting essentially of evaporating off water and alcohol as volatile components from said mixture to obtain a catalyst powder comprising said metal-containing silicate and said at least two catalytic metals supported thereon,
   (2) then activating said catalyst powder by an activation treatment comprising heating said catalyst powder to a temperature of 150–300° C. for a period of time effective to drive off at least one material adsorbed in pores of said catalyst powder to make said catalyst powder catalytically active so as to provide said catalyst, said catalyst being capable of removing NOx from exhaust gas formed by the engine operated under the continuous lean mode; and
   (3) subsequently mixing said catalyst with a binder and water to form a slurry, and coating the slurry on said support member.

2. The process according to claim 1, wherein the activation temperature is 180–300° C.

3. The process according to claim 1, wherein the period of the time for the activation treatment is three hours or longer.

4. The process according to claim 1, wherein the catalytic metal is selected from the group consisting of noble metals, transition metals and alkaline earth metals.

5. The process according to claim 1, wherein the activation treatment is carried out under an atmospheric pressure.

6. The process according to claim 1, wherein the activation temperature is 200–260° C.

7. The process according to claim 1, wherein the catalytic metal is iridium and iridium is present as a salt in the alcohol dispersion.

8. The process according to claim 1, wherein at least one material adsorbed in pores of the metal-containing silicate is desorbed from the metal-containing silicate by the activation treatment.

9. A process for production of a catalyst applied to a structural support member for cleaning exhaust gas formed by an engine operated under a continuous lean mode, comprising:
   (1) supporting at least two catalytic metals as active components on a metal-containing silicate by a supporting treatment comprising:
      (a) mixing the metal containing silicate with an aqueous solution comprising one of said at least two catalytic metals and an alcohol dispersion comprising another of said at least two catalytic metals to form a slurry and
      (b) then depositing said at least two catalytic metals by a deposition method consisting essentially of forming droplets from the slurry followed by rapidly drying the droplets by contacting the droplets with hot gas to form a catalyst powder comprising said metal-containing silicate and said at least two catalytic metals supported thereon,
   (2) then activating said catalyst powder by an activation treatment comprising heating said catalyst powder to a temperature of 150–300° C. for a period of time effective to drive off at least one material adsorbed in pores of said catalyst powder to make said catalyst powder catalytically active so as to provide said catalyst, said catalyst being capable of removing NOx from exhaust gas formed by the engine operated under the continuous lean mode; and
   (3) subsequently mixing said catalyst with a binder and water to form a slurry, and coating the slurry on said support member.

10. The process according to claim 9, wherein the activation temperature is 180–300° C.

11. The process according to claim 9, wherein the period of the time for the activation treatment is three hours or longer.

12. The process according to claim 9, wherein the catalytic metal is selected from the group consisting of noble metals, transition metals and alkaline earth metals.

13. The process according to claim 9, wherein the activation treatment is carried out under an atmospheric pressure.

14. The process according to claim 9, wherein the catalytic metal is iridium and iridium is present as a salt in the alcohol dispersion.

15. The process according to claim 9, wherein at least one material adsorbed in pores of the metal-containing silicate is desorbed from the metal-containing silicate by the activation treatment.

16. A process for production of a catalyst according to claim 4, wherein the noble metals are platinum, rhodium and iridium, the aqueous solution comprises ammineplatinum (II) and rhodium nitrate and the alcohol dispersion comprises iridium trichloride.

17. The process according to claim 16, wherein the activation temperature is 180–300° C.

18. The process according to claim 16, wherein the period of the time for the activation treatment is three hours or longer.

19. The process according to claim 16, wherein the catalytic metal is selected from the group consisting of noble metals, transition metals and alkaline earth metals.

20. The process according to claim 16, wherein the activation treatment is carried out under an atmospheric pressure.

21. The process according to claim 16, wherein the catalytic metal is iridium and iridium is present as a salt in the alcohol dispersion.

22. The process according to claim 16, wherein at least one material adsorbed in pores of the metal-containing silicate is desorbed from the metal-containing silicate by the activation treatment.

23. A process for production of a catalyst according to claim 12, wherein the noble metals are platinum, rhodium and iridium, the aqueous solution comprises ammineplatinum (II) and rhodium nitrate and the alcohol dispersion comprises iridium trichloride.

24. The process according to claim 23, wherein the activation temperature is 180–300° C.

25. The process according to claim 23, wherein the period of the time for the activation treatment is three hours or longer.

26. The process according to claim 23, wherein the catalytic metal is selected from the group consisting of noble metals, transition metals and alkaline earth metals.

27. The process according to claim 23, wherein the activation treatment is carried out under an atmospheric pressure.

28. The process according to claim 23, wherein the activation temperature is 200–260° C.

29. The process according to claim 23, wherein the catalytic metal is iridium and iridium is present as a salt in the alcohol dispersion.

30. The process according to claim 23, wherein the activation treatment removes adsorbed materials.

31. The process according to claim 23, wherein at least one material adsorbed in pores of the metal-containing silicate is desorbed from the metal-containing silicate by the activation treatment.

32. A process for production of a catalyst applied to a structural support member for cleaning exhaust gas formed by an engine operated under a continuous lean mode, comprising the steps of:

(1) supporting at least one catalytic metal as an active component on a metal-containing silicate by a supporting treatment comprising mixing the metal containing silicate with an aqueous solution and/or an alcohol dispersion which contains said at least one catalytic metal to form a mixture and then evaporating off water and/or alcohol as a volatile component from the mixture, (2) then activating the metal-containing silicate having said at least one catalytic metal supported thereon by an activation treatment comprising heating the metal-containing silicate to an activation treatment temperature of 150–300° C. for a period of time effective to drive off at least one material adsorbed in pores of the metal-containing silicate to make said at least one catalytic metal supported on the metal-containing silicate catalytically active so as to provide said catalyst; and (3) subsequently mixing the metal-containing silicate with a binder having said at least one catalytic metal supported thereon and water to form a slurry, and coating the slurry on said support member.

33. A process for production of a catalyst applied to a structural support member for cleaning exhaust gas formed by an engine operated under a continuous lean mode, comprising:

(1) supporting at least one catalytic metal as an active component on a metal-containing silicate by a supporting treatment comprising:
  (a) mixing the metal containing silicate with an aqueous solution or an alcohol dispersion which contains said at least one catalytic metal to form a mixture and
  (b) then depositing said at least one catalytic metal by a deposition method consisting essentially of evaporating off water or alcohol as a volatile component from said mixture to obtain a catalyst powder comprising said metal-containing silicate and said at least one catalytic metal supported thereon, (2) then activating said catalyst powder by an activation treatment comprising heating said catalyst powder to a temperature of 150–300° C. for a period of time effective to drive off at least one material adsorbed in pores of said catalyst powder to make said catalyst powder catalytically active so as to provide said catalyst, said catalyst being capable of removing NOx from exhaust gas formed by the engine operated under the continuous lean mode; and (3) subsequently mixing said catalyst with a binder and water to form a slurry, and coating the slurry on said support member.

34. A process for production of a catalyst applied to a structural support member for cleaning exhaust gas formed by an engine operated under a continuous lean mode, comprising:

(1) supporting at least one catalytic metal as an active component on a metal-containing silicate by a supporting treatment comprising:
  (a) mixing the metal containing silicate with an aqueous solution or an alcohol dispersion which contains said at least one catalytic metal to form a mixture and (b) then depositing said at least one catalytic metal by a deposition method consisting essentially of forming droplets from the slurry followed by rapidly drying the droplets by contacting the droplets with hot gas to form a catalyst powder comprising said metal-containing silicate and said at least one catalytic metal supported thereon, (2) then activating said catalyst powder by an activation treatment comprising heating said catalyst powder to a temperature of 150–300° C. for a period of time effective to drive off at least one material adsorbed in pores of said catalyst powder to make said catalyst powder catalytically active so as to provide said catalyst, said catalyst being capable of removing NOx from exhaust gas formed by the engine operated under the continuous lean mode; and (3) subsequently mixing said catalyst with a binder and water to form a slurry, and coating the slurry on said support member.

* * * * *